(12) United States Patent
Qiu et al.

(10) Patent No.: US 9,160,655 B2
(45) Date of Patent: Oct. 13, 2015

(54) METHOD, SYSTEM, AND DEVICE FOR ESTABLISHING PSEUDO WIRE

(75) Inventors: Chaowa Qiu, Shenzhen (CN); Li Xuei, Shenzhen (CN); Changbao Liu, Shenzhen (CN); Wei Cao, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 287 days.

(21) Appl. No.: 13/548,880

(22) Filed: Jul. 13, 2012

(65) Prior Publication Data
US 2012/0281702 A1    Nov. 8, 2012

Related U.S. Application Data

(63) Continuation of application No. PCT/CN2011/070308, filed on Jan. 17, 2011.

(30) Foreign Application Priority Data

Jan. 15, 2010    (CN) .......................... 2010 1 0001249

(51) Int. Cl.
| | |
|---|---|
| H04L 1/00 | (2006.01) |
| H04L 12/723 | (2013.01) |
| H04L 12/707 | (2013.01) |
| H04L 12/721 | (2013.01) |
| H04L 12/703 | (2013.01) |

(52) U.S. Cl.
CPC ................ H04L 45/50 (2013.01); H04L 45/22 (2013.01); H04L 45/68 (2013.01); H04L 45/28 (2013.01)

(58) Field of Classification Search
CPC ................................. H04L 45/68; H04L 47/10

USPC ......... 370/235, 237, 236, 395.2, 395.21, 400, 370/401, 410, 462, 522
See application file for complete search history.

(56) References Cited

U.S. PATENT DOCUMENTS

| | | | |
|---|---|---|---|
| 7,408,941 | B2 | 8/2008 | Martini et al. |
| 8,130,775 | B2 * | 3/2012 | Jounay et al. ................. 370/401 |

(Continued)

FOREIGN PATENT DOCUMENTS

| | | |
|---|---|---|
| CN | 1625176 A | 6/2005 |
| CN | 1874302 A | 12/2006 |

(Continued)

OTHER PUBLICATIONS

Extended European Search Report issued in corresponding European Patent Application No. 11732683.5, mailed Jan. 25, 2013.

(Continued)

*Primary Examiner* — Ajay Cattungal
(74) *Attorney, Agent, or Firm* — Brinks Gilson & Lione (57) ABSTRACT

A method, a system, and a device for establishing a pseudo wire are disclosed. The method includes: receiving, by a switching provider edge at a bifurcation position, a label mapping message, obtaining information of the switching provider edge at the bifurcation position and information of at least two next hops or outgoing interfaces of the switching provider edge through parsing, comparing the information of the switching provider edge at the bifurcation position with information of a local device, and if the information of the switching provider edge at the bifurcation position matches with the information of the local device, establishing at least two pseudo wires from the switching provider edge according to the information of at least two next hops or outgoing interfaces.

13 Claims, 6 Drawing Sheets

(56) References Cited

U.S. PATENT DOCUMENTS

| | | | |
|---|---|---|---|
| 8,804,749 B2* | 8/2014 | Jounay et al. | 370/401 |
| 2005/0129059 A1 | 6/2005 | Jiang et al. | |
| 2006/0190570 A1* | 8/2006 | Booth et al. | 709/220 |
| 2007/0242603 A1* | 10/2007 | Ghosh et al. | 370/216 |
| 2008/0095061 A1* | 4/2008 | Hua et al. | 370/248 |
| 2008/0175234 A1* | 7/2008 | Li | 370/389 |
| 2008/0229059 A1* | 9/2008 | May | 712/16 |
| 2008/0240121 A1 | 10/2008 | Xiong et al. | |
| 2008/0259931 A1* | 10/2008 | Papadimitriou | 370/395.3 |
| 2008/0279110 A1* | 11/2008 | Hart et al. | 370/248 |
| 2009/0201831 A1 | 8/2009 | Kumar et al. | |
| 2010/0098094 A1* | 4/2010 | Jounay et al. | 370/401 |

FOREIGN PATENT DOCUMENTS

| | | |
|---|---|---|
| CN | 1983960 A | 6/2007 |
| CN | 101035019 A | 9/2007 |
| CN | 101159573 A | 4/2008 |
| CN | 101505227 A | 8/2009 |
| CN | 101552711 A | 10/2009 |
| JP | 2007028386 A | 2/2007 |
| JP | 2008211704 A | 9/2011 |
| WO | WO 2008/110735 A2 | 9/2008 |

OTHER PUBLICATIONS

Muley et al., "Preferential Forwarding Status bit Definition" Network Working Group, Oct. 24, 2009.

International Search Report and Written Opinion of the International Searching Authority issued in corresponding PCT Patent Application No. PCT/CN2011/070308, mailed Apr. 28, 2011.

Jounay et al., "LDP Extensions for Leaf-Initiated Point-to-Multipoint Pseudowire" Network Working Group, Nov. 3, 2008.

Martini et al., "Pseudowire Setup and Maintenance Using the Label Distribution Protocol (LDP)" Network Working Group, Apr. 2006.

* cited by examiner

A switching provider edge receives a label mapping message, where the label mapping message includes: information of a switching provider edge at a bifurcation position and information of at least two next hops or outgoing interfaces — 101

The switching provider edge parses the label mapping message to obtain the information of the switching provider edge at the bifurcation position and the information of at least two next hops or outgoing interfaces — 102

If the information of the switching provider edge at the bifurcation position matches with information of a local device, establish at least two pseudo wires from the switching provider edge according to the information of at least two next hops or outgoing interfaces — 103

A switching provider edge forms pseudo wire routing entry information, where the pseudo wire routing entry information includes a corresponding relationship between a first destination address and at least two next hop addresses, or information of at least two pseudo wire routes to a device that is corresponding to the first destination address — 301

When receiving pseudo wire establishing signaling, where the pseudo wire establishing signaling requests that a pseudo wire to the device that is corresponding to the first destination address be established, the switching provider edge establishes at least two pseudo wires from a local device according to the at least two next hop addresses or information of a pseudo wire route — 302

METHOD, SYSTEM, AND DEVICE FOR ESTABLISHING PSEUDO WIRE

CROSS-REFERENCE TO RELATED APPLICATIONS

This application is a continuation of International Application No. PCT/CN2011/070308, filed on Jan. 17, 2011, which claims priority to Chinese Patent Application No 201010001249.6, filed on Jan. 15, 2010, both of which are hereby incorporated by reference in their entireties.

FIELD OF THE INVENTION

The present invention relates to the field of communications technologies, and in particular to a method, a system, and a device for establishing a pseudo wire.

BACKGROUND OF THE INVENTION

In actual networking application, a network constructed by using a large number of single-segment pseudo wires (Single-Segment Pseudo-Wire, SS-PW) brings great pressure on a service convergence device. A multi-segment pseudo-wire (Multi-Segment Pseudo-Wire, MS-PW) technology is proposed in the field of pseudo-wire emulation edge to edge (Pseudo-Wire Emulation Edge to Edge, PWE3) technologies, where a switching provider edge (Switching PE, S-PE, hereinafter referred to as SPE) is mainly used to relieve pressure of a convergence device and solve cross-domain deployment and security problems of a network.

Figure 1A:
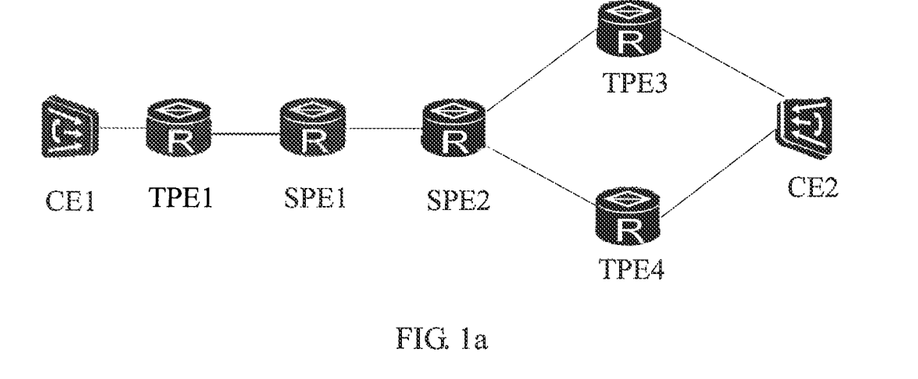
FIG. 1a is a schematic structural diagram of a networking system constructed by an MS-PW.

Referring to FIG. 1a, in a networking system constructed by using an MS-PW, when a local customer edge (CE1) communicates with a peer CE2, the communication needs to implement through a terminating provider edge (Terminating Provider Edge, TPE1) of a service provider, where the terminating provider edge is directly connected to the local CE1, and pseudo-wire connections to a TPE3 and a TPE4 respectively by passing through an SPE1 and an SPE2 are established. A pseudo wire between PEs (including a TEE and a SPE) is established through the following steps:

1: Establish session connections between the TPE1 and the SPE1, the SPE2 as well as the TPE3; and establish session connections between the TPE1 and the SPE1, the SPE2 as well as the TPE4.

2: Establish a PW route through a routing protocol.

3: The TPE1 sends a label mapping message (label mapping) to establish a multi-segment pseudo wire from the TPE1 to the TPE3; and the TPE1 sends a label mapping message to establish another multi-segment pseudo wire from the TPE1 to the TPE4, where one of the multi-segment pseudo Wires may be set as an active pseudo wire during an establishment process.

4: After receiving the label mapping message, the TPE3 or the TPE4 finishes establishing a reverse pseudo wire to the TPE1.

After the preceding pseudo wires are established, when communication is established between two customer edges, and when a TPE finds that the active pseudo wire fails, an active/standby pseudo wire switchover is performed. In this way, the active/standby pseudo wire switchover can only be completed from a local TPE to a peer TPE, so that a pseudo wire protection switchover between customer edges lasts for a long time.

SUMMARY OF THE INVENTION

Embodiments of the present invention provide a method, a system, and a device for establishing a pseudo wire, to speed up a procedure of a pseudo wire protection switchover between customer edges and save a network resource.

An embodiment of the present invention provides a method for establishing a pseudo wire, where the method includes:

receiving a label mapping message, where the label mapping message includes: information of a switching provider edge at a bifurcation position and information of at least two next hops or at least two outgoing interfaces of the switching provider edge at the bifurcation position;

parsing the label mapping message to obtain the information of the switching provider edge at the bifurcation position and the information of the at least two next hops or at least two outgoing interfaces; and comparing information of a local device with the information of the switching provider edge at the bifurcation position, and if the information of the local device matches with the information of the switching provider edge at the bifurcation position, establishing at least two pseudo wires from the switching provider edge according to the information of the at least two next hops or at least two outgoing interfaces.

An embodiment of the present invention provides a method for establishing a pseudo wire, where the method includes:

forming pseudo wire routing entry information, where the pseudo wire routing entry information includes: a corresponding relationship between a first destination address and at least two next hop addresses, or information of at least two different pseudo wire routes to a device that is corresponding to the first destination address; and when pseudo wire establishing signaling is received, where the pseudo wire establishing signaling requests that a pseudo wire to the device that is corresponding to the first destination address be established, establishing at least two pseudo wires from a local device according to the at least two next hop addresses or the information of at least two different routes to the device that is corresponding to the first destination address.

An embodiment of the present invention provides a switching provider edge, including:

a packet receiving unit, configured to receive a label mapping message, where the label mapping message includes: information of a switching provider edge at a bifurcation position and information of at least two next hops or at least two outgoing interfaces of the switching provider edge at the bifurcation position;

a parsing unit, configured to parse the label mapping message received by the packet receiving unit to obtain the information of the switching provider edge at the bifurcation position and the information of at least two next hops or at least two outgoing interfaces; and a matching and establishing unit, configured to compare the information of the switching provider edge at the bifurcation position with information of a local device, where the information of the switching provider edge at the bifurcation position is obtained by the parsing unit through parsing, and if the information of the switching provider edge at the bifurcation position matches with the information of the local device, establish at least two pseudo wires from the switching provider edge according to the information of at least two next hops or at least two outgoing interfaces.

An embodiment of the present invention provides a terminating provider edge TPE of a service provider, including:

a packet generating unit, configured to generate a label mapping message, where the label mapping message includes: information of a switching provider edge at a bifurcation position and information of at least two next hops or at least two outgoing interfaces of the switching provider edge at the bifurcation position; and a packet sending unit, configured to send the label mapping message generated by the packet generating unit to a switching provider edge, so that a switching provider edge that matches with the information of the switching provider edge at the bifurcation position establishes at least two pseudo wires from the switching provider edge according to the information of two next hops or at least two outgoing interfaces.

An embodiment of the present invention provides a switching provider edge, including:

a corresponding relationship forming unit, configured to form pseudo wire routing entry information, where the pseudo wire routing entry information includes: a corresponding relationship between a first destination address and at least two next hop addresses, or information of at least two different routes to a device that is corresponding to the first destination address; and a pseudo wire establishing unit, configured to, when pseudo wire establishing signaling is received, where the pseudo wire establishing signaling requests that a pseudo wire to the device that is corresponding to the first destination address be established, establish at least two pseudo wires from a local device according to the at least two next hop addresses that are corresponding to the first destination address, or the information of at least two different routes to the device that is corresponding to the first destination address, where the at least two next hop addresses that are corresponding to the first destination address or the information of at least two different routes to the device that is corresponding to the first destination address is formed by the corresponding relationship forming unit.

An embodiment of the present invention provides a system for establishing a pseudo wire, where the system includes a switching provider edge and a terminating provider edge TPE of a service provider, where the terminating provider edge TPE of the service provider is configured to generate a label mapping message, where the label mapping message includes information of a switching provider edge at a bifurcation position and information of at least two next hops or at least two outgoing interfaces of the switching provider edge at the bifurcation position; and send the generated label mapping message to the switching provider edge; and the switching provider edge is configured to receive the label mapping message, parse the label mapping message to obtain the information of the switching provider edge at the bifurcation position and the information of at least two next hops or at least two outgoing interfaces of the switching provider edge at the bifurcation position; compare the information of the switching provider edge at the bifurcation position with information of a local device; and if the information of the switching provider edge at the bifurcation position matches with the information of the local device, establish at least two pseudo wires from the switching provider edge according to the information of at least two next hops or at least two outgoing interfaces.

The method for establishing a pseudo wire in this embodiment is applicable to pseudo wire establishment in an MS-PW system, and includes: receiving, by a switching provider edge, a label mapping message sent by a TPE that is directly connected to a customer edge; obtaining information of a switching provider edge at a bifurcation position and information of at least two next hops or at least two outgoing interfaces of the switching provider edge through parsing; and establishing at least two pseudo wires from the switching provider edge according to the information of at least two next hops or at least two outgoing interfaces. When the method in this embodiment of the present invention is adopted to establish at least two pseudo wires, the TPE only needs to send one label mapping message to establish at least two pseudo wires. Compared with the prior art in which the TPE sends one label mapping message to establish one pseudo wire, with the method for establishing a pseudo wire in this embodiment, multiple pseudo wires from the switching provider edge at the bifurcation position to a destination node are required. In this way, a network resource can be saved and highly effective protection can be provided for an MS-PW.

In addition, the switching provider edge at the bifurcation position establishes two pseudo wires and completes establishment of MS-PW segments, and furthermore, an active/standby identification of the MS-PW segments may be implemented. When it is determined that an active pseudo wire segment is faulty, a fast protection switchover of an MS-PW may be implemented on the switching provider edge. In this way, a fast recovery procedure of a pseudo wire is speeded up, and segment protection of the MS-PW can be provided from the switching provider edge at the bifurcation position, thereby making better use of a network resource.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are merely some embodiments of the present invention, and persons of ordinary skill in the art may still obtain other drawings according to these accompanying drawings without creative efforts.

DETAILED DESCRIPTION OF THE EMBODIMENTS

The technical solutions in embodiments of the present invention are clearly and fully described in the following with reference to the accompanying drawings in the embodiments of the present invention. Apparently, the embodiments to be described are only a part rather than all of the embodiments of the present invention. Based on the embodiments of the present invention, all other embodiments obtained by persons of ordinary skill in the art without creative efforts shall fall within the protection scope of the present invention.

Method Embodiment 1

Figure 1B:
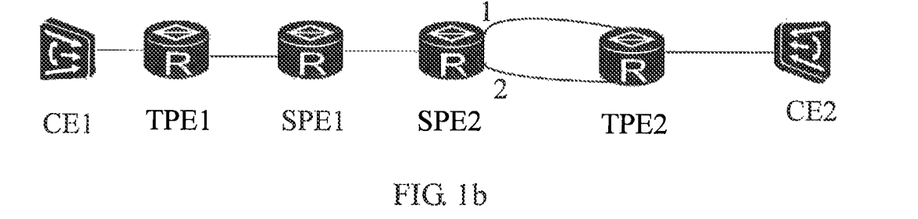
FIG. 1b is a schematic structural diagram of another networking system constructed by an MS-PW.
Figure 2:
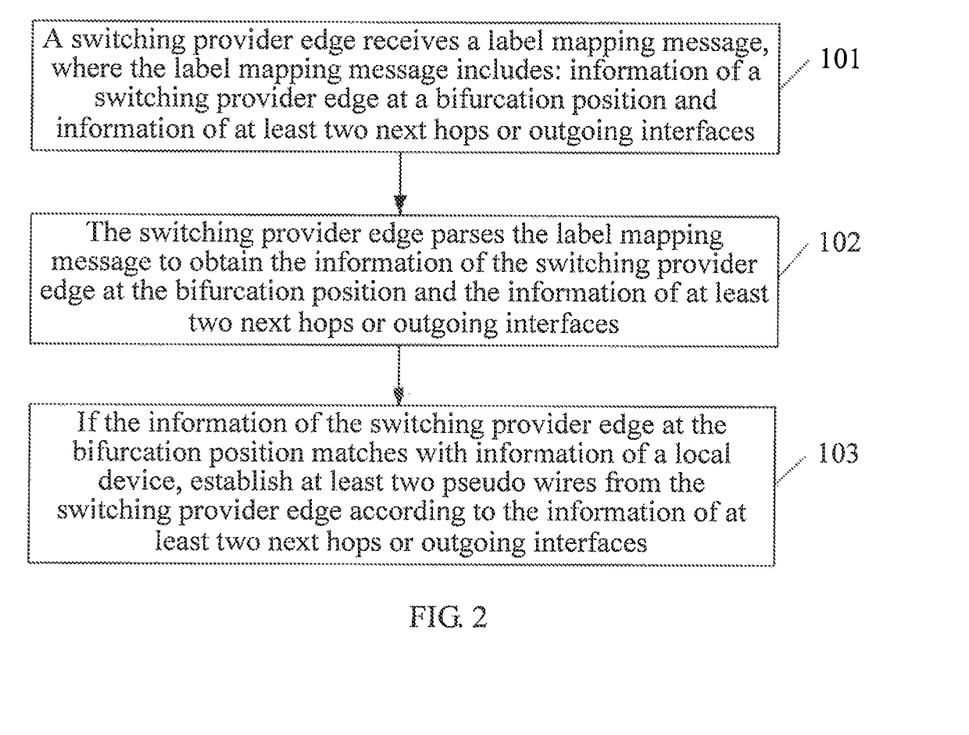
FIG. 2 is a flow chart of a method for establishing a pseudo wire according to a first method embodiment of the present invention.

A method for establishing a pseudo wire is provided, and the method in this embodiment is applicable to an MS-PW system as shown in FIG. 1a, where within a multi-segment pseudo wire MS-PW between a CE1 and a CE2, a switching provider edge SPE2 is connected to two different TPEs respectively; and is also applicable to an MS-PW system as shown in FIG. 1b, where a switching provider edge SPE2 may reach a TPE2 through different outgoing interfaces. A flow chart of the method in this embodiment is shown in FIG. 2, where the method includes:

Step 101: A switching provider edge receives a label mapping message, where the label mapping message includes: information of a switching provider edge at a bifurcation position and information of at least two next hops or at least two outgoing interfaces of the switching provider edge at the bifurcation position.

The switching provider edge at the bifurcation position here refers to a switching provider edge that implements redundancy protection of a pseudo wire. The switching provider edge may be connected to two different TPF devices. As shown in FIG. 1a, the switching provider edge at the bifurcation position is a SPE2 that is connected to a TPE3 and a TPE4 respectively. It may also be that the switching provider edge may reach the same next-hop device through different outgoing interfaces. As shown in FIG. 1b, a switching provider edge SPE2 at the bifurcation position is connected to a next-hop device TPE2 through outgoing interfaces 1 and 2.

It may be understood that, the label mapping message may further include information related to an explicit path, where the information related to the explicit path is used for releasing explicit routing information, for example, active/standby information indicating establishment of at least two pseudo wires, and so on.

Step 102: The switching provider edge parses the label mapping message to obtain the information of the switching provider edge at the bifurcation position and the information of at least two next hops or at least two outgoing interfaces.

It may be understood that, when the label mapping message is parsed to obtain the information of the switching provider edge at the bifurcation position and the information of at least two next hops or at least two outgoing interfaces, explicit path (explicit path) information, for example, information in additional information (Sub-TLV) in type, length and value (Type Length Value, TLV), in the label mapping message may be parsed. The information of the switching provider edge may be a device identifier, and so on, and information of a next hop may be information such as an Internet Protocol (IP) address of a device.

Step 103: The switching provider edge compares the information of the switching provider edge at the bifurcation position with information of a local device; if the information of the switching provider edge at the bifurcation position matches with the information of the local device, at least two pseudo wires are established from the switching provider edge according to the information of at least two next hops or at least two outgoing interfaces; while if the information of the switching provider edge at the bifurcation position does not match with the information of the local device, it indicates that the switching provider edge is not at a bifurcation position, and the label mapping message is forwarded to a next-hop node device, to complete establishment of an MS-PW segment.

If the obtained information of the switching provider edge at the bifurcation position matches with the information of the local device, it indicates that the switching provider edge is the switching provider edge at the bifurcation position, which is corresponding to the SPE2 in FIG. 1. At least two pseudo wires are established from the switching provider edge according to the information of at least two next hops or at least two outgoing interfaces. Specifically, one pseudo wire may be established between the switching provider edge and a TPE device that is corresponding to information of each next-hop address, or one pseudo wire is established between the switching provider edge and a next-hop TPE device respectively through at least two outgoing interfaces.

It may be understood that, the number of established pseudo wires is less than or equal to the number of next hops, or less than or equal to the number of outgoing interfaces. For example, when information of four next hops exists, two, three or four pseudo wires may be established.

During a pseudo wire establishment process, one of the pseudo wires may be set as an active pseudo wire, and another pseudo wire may be set as a standby pseudo wire according to a preset policy. In this way, after the pseudo wires are established, when the switching provider edge at the bifurcation position determines that the active pseudo wire is faulty, a fast protection switchover of the pseudo wires may be directly performed.

The method for establishing a pseudo wire in this embodiment is applicable to pseudo wire establishment in an MS-PW system, and includes: receiving, by a switching provider edge, a label mapping message sent by a TPE that is directly connected to a customer edge; obtaining information of a switching provider edge at a bifurcation position and information of at least two next hops or at least two outgoing interfaces of the switching provider edge through parsing, and establishing at least two pseudo wires from the switching provider edge according to the information of at least two next hops or at least two outgoing interfaces. When the method in this embodiment of the present invention is adopted to establish at least two pseudo wires, the TPE only needs to send one label mapping message to establish at least two pseudo wires. Compared with the prior art in which the TPE sends one label mapping message to establish one pseudo wire, with the method for establishing a pseudo wire in this embodiment, multiple pseudo wires from the switching provider edge at the bifurcation position to a destination node are established. In this way, a resource consumed by pseudo wire establishment can be reduced. In addition, the switching provider edge at the bifurcation position establishes two pseudo wires and completes establishment of multiple MS-PW segments, and furthermore, an identification of an active/standby MS-PW segment may be implemented. When it is determined that an active pseudo wire is faulty, a fast protection switchover of an MS-PW may be implemented on the switching provider edge. In this way, a fast recovery procedure of a pseudo wire is speeded up, and segment protection of the MS-PW can be provided from the switching provider edge at the bifurcation position, thereby making better use of a network resource.

In a specific embodiment of the present invention, before establishing at least two pseudo wires in step 103, the switching provider edge may further obtain active/standby relationship information of the at least two pseudo wires, and establish at least two pseudo wires according to the active/standby relationship information. Specifically, the information may be obtained by directly parsing information in Sub-TLV in a received label mapping message, and may also be obtained by receiving an active/standby pseudo wire information notification sent by a customer edge and parsing active/standby pseudo wire information in the active/standby pseudo wire information notification, and may also be obtained according to a preset policy, which is not intended to limit the embodiments of the present invention.

Method Embodiment 2

Figure 3:
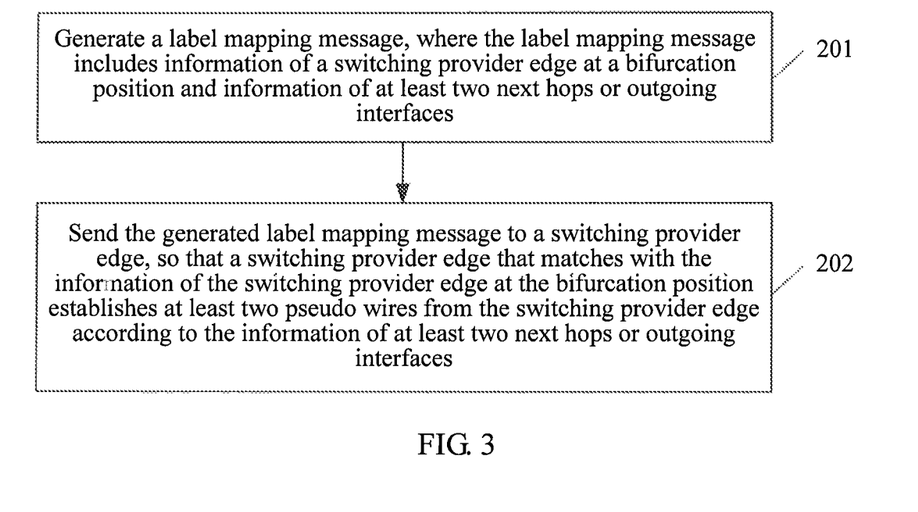
FIG. 3 is a flow chart of a method for establishing a pseudo wire according to a second method embodiment of the present invention.

A method for establishing a pseudo wire is provided, and the method in this embodiment is applicable to an MS-PW system as shown in FIG. 1a, where within a multi-segment pseudo wire MS-PW between a CE1 and a CE2, a switching provider edge SPE2 is connected to two different TPEs respectively; and is also applicable to an MS-PW system as shown in FIG. 1b, where a switching provider edge SPE2 may reach a TPE2 through different outgoing interfaces. A flow chart of the method in this embodiment is shown in FIG. 3, where the method includes:

Step 201: A TPE1 generates a label mapping message, where the label mapping message includes information of a switching provider edge at a bifurcation position and information of two next hops or at least two outgoing interfaces of the switching provider edge at the bifurcation position.

It may be understood that, when releasing an explicit route, the TPE configures a source attachment individual identifier (source attachment individual identifier, SAII), an attachment group identifier (attachment group identifier, AGI), TAII information, and information of an explicit path to a TPE that is directly connected to a peer customer edge.

Figure 4:
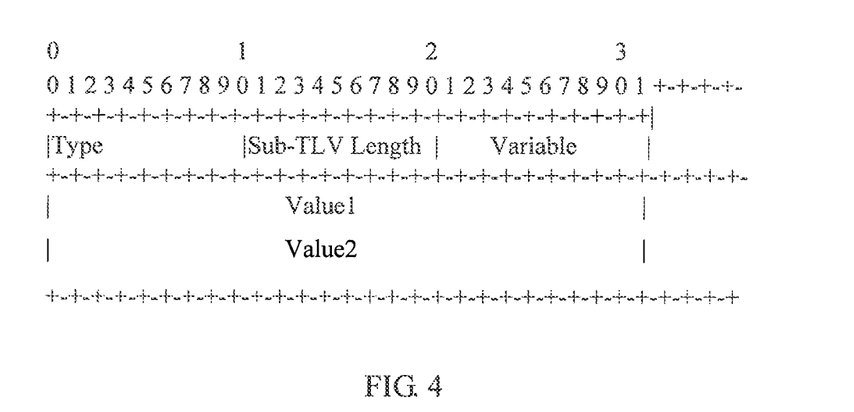
FIG. 4 is a schematic diagram of additional information Sub-TLV according to an embodiment of the present invention.

The switching provider edge at the bifurcation position refers to a switching provider edge that implements redundancy protection of a pseudo wire. When at least two multi-segment pseudo-wires MS-PW exist between customer edges, the TPE compares devices through which the at least two multi-segment pseudo-wires pass, to obtain the information of the switching provider edge at the bifurcation position. When generating the label mapping message, the TPE adds additional information (Sub-TLV), namely sub-TLV, to explicit path information TLV in the label mapping message, where the additional information Sub-TLV carries the information of the switching provider edge at the bifurcation position and the information of at least two next hops or at least two outgoing interfaces of the switching provider edge. FIG. 4 is a structural diagram of specific Sub-TLV, where Value may be an IPv4 address, and may also be an IPv6 address.

Step 202: The TPE sends the generated label mapping message to a switching provider edge, so that a switching provider edge that matches with the information of the switching provider edge at the bifurcation position establishes at least two pseudo wires from the switching provider edge according to the information of at least two next hops or at least two outgoing interfaces.

After the switching provider edge receives the generated label mapping message, the method for establishing a pseudo wire is as described in the first method embodiment, and is not described here again.

It may be understood that, the TPE may also carry, in the Sub-TLV in the label mapping message, active/standby relationship information of a multi-segment pseudo wire between customer edges. In this way, after receiving the label mapping message, the switching provider edge at the bifurcation position sets at least two pseudo wires according to the active/standby relationship information.

In a specific embodiment, the TPE may also send an active/standby pseudo wire information notification to the switching provider edge to notify an active/standby condition of at least two pseudo wires that are established from the switching provider edge at the bifurcation position. In this way, the switching provider edge that matches with the information of the switching provider edge at the bifurcation position establishes at least two pseudo wires according to the active/standby pseudo wire information notification.

The method for establishing a pseudo wire in this embodiment is applicable to pseudo wire establishment in an MS-PW system, and includes: generating, by a TPE that is connected to a customer edge, a label mapping message, where the label mapping message includes information of a switching provider edge at a bifurcation position and information of at least two next hops or at least two outgoing interfaces of the switching provider edge; and after receiving the label mapping message, establishing, by the switching provider edge at the bifurcation position, at least two pseudo wires from the switching provider edge according to the information of at least two next hops or at least two outgoing interfaces. When the method in this embodiment of the present invention is adopted to establish at least two pseudo wires, the TPE only needs to send one label mapping message to establish at least two pseudo wires. Compared with the prior art in which the TPE sends one label mapping message to establish one pseudo wire, with the method for establishing a pseudo wire in this embodiment, multiple pseudo wires from the switching provider edge at the bifurcation position to a destination node are established. In this way, a resource consumed by pseudo wire establishment can be reduced. In addition, after the switching provider edge at the bifurcation position establishes at least two pseudo wires, one of the pseudo wires is an active pseudo wire. In this way, when the switching provider edge at the bifurcation position determines that the active pseudo wire is faulty, an active/standby pseudo wire switchover may be performed directly. Compared with the prior art in which the TPE needs to send switchover signaling to perform a switchover, a procedure of a pseudo wire protection switchover is simplified. Segment protection may be provided from the switching provider edge at the bifurcation position, thereby making better use of a network resource.

Method Embodiment 3

Figure 5:
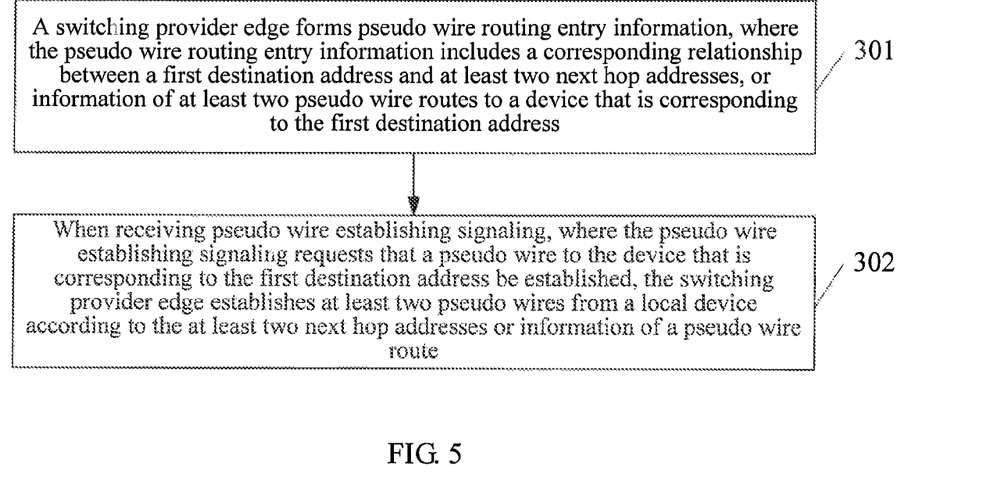
FIG. 5 is a flow chart of a method for establishing a pseudo wire according to a third method embodiment of the present invention.

A method for establishing a pseudo wire is provided, and the method in this embodiment is applicable to an MS-PW system as shown in FIG. 1, where within a multi-segment pseudo wire between a CE1 and a CE2, a switching provider edge SPE2 is connected to two different TPEs respectively, and configures the same anycast (Anycast) address on the two different TPEs, namely, a TPE3 and a TPE4; and is also applicable to an MS-PW system as shown in FIG. 1b, where a switching provider edge SPE2 may reach a TPE2 through different outgoing interfaces. A flow chart of the method for establishing a pseudo wire in this embodiment is shown in FIG. 5, where the method includes:

Step 301: During a process of extending routing information, pseudo wire routing entry information is formed on the switching provider edge SPE2, where the information includes: a corresponding relationship between a first destination address and at least two next hop addresses, namely, a corresponding relationship between an anycast address and at least two next hop addresses, or information of at least two different pseudo wire routes to a device that is corresponding to the first destination address.

It may be understood that, in the case as shown in FIG. 1a, if communication is established between the CE1 and the CE2, PW routing entry information, namely, a corresponding relationship between a destination address (Destination) and a next hop address (Next Hop), is formed in a route diffusion process. Specifically, release of a PW route is completed through a routing protocol, and PW routing entry information is formed on a device. The TPE3 and the TPE4 are configured with the same anycast address, and the two devices release routing information according to the same address. Routing entry information is formed on a passed switching provider edge.

For the switching provider edge SPE2 at the bifurcation position, a routing entry in which the same destination address corresponds to at least two different next hop addresses is formed.

In the case as shown in FIG. 1b, if communication is established between the CE1 and the CE2, PW routing entry information is formed during a route diffusion process, where the information includes a corresponding relationship between a destination address and device outgoing interfaces. When a TPE1 sends a route extension message, routing information is released by using a destination address as an address of the TPE1, and routing entry information is formed on a passed switching provider edge. When the TPE2 sends a routing message, routing information is released by using an address of the TPE2 as a destination address. Information of at least two pseudo wire routes from the SPE2 to the TPE2 through at least two outgoing interfaces is released, and routing entry information is formed on a passed switching provider edge.

For the switching provider edge SPE2 at the bifurcation position, a routing entry in which the same destination address corresponds to information of at least two different pseudo wire routes is formed.

Step 302: When receiving pseudo wire establishing signaling, where the pseudo wire establishing signaling requests that a pseudo wire to the device that is corresponding to the first destination address be established, the switching provider edge SPE2 establishes at least two pseudo wires from a local device, that is, the switching provider edge, according to the at least two next hop addresses, or the information of at least two different routes to the device that is corresponding to the first destination address.

It may be understood that, before pseudo wire establishment, active/standby pseudo wire information of at least two pseudo wires may be obtained. At least two pseudo wires are established according to the active/standby pseudo wire information. The active/standby pseudo wire information may be obtained according to such a method in which a policy is preset by a local device.

Figure 6:
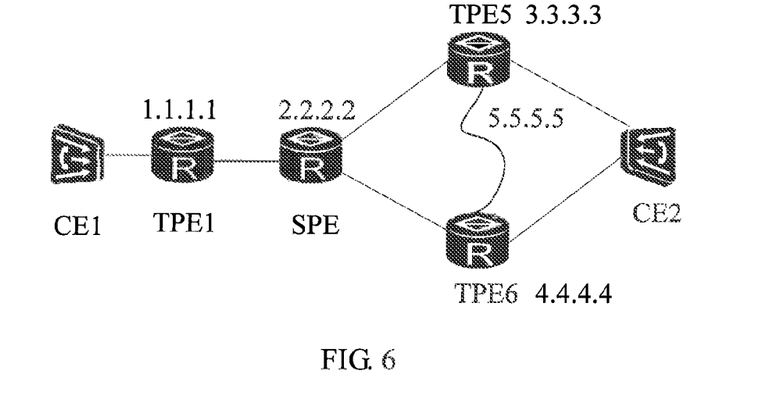
FIG. 6 is a schematic structural diagram of an MS-PW system to which a method for establishing a pseudo wire is applicable according to a method embodiment of the present invention.

A specific embodiment is taken as an example for description. A schematic structural diagram is shown in FIG. 6, where a switching provider edge SPE is connected to two TPEs. First, the same anycast address 5.5.5.5 needs to be configured on a TPE5 and a TPE6. A pseudo wire establishment process is specifically implemented through the following method:

1. Preparation Work for Pseudo Wire Establishment, Namely, Release of Routing Information:

Diffusion of routing information: During a routing information diffusion process, pseudo wire routing entry information is formed on a device. A TPE1 sends a route extension message, and releases routing information with 1.1.1.1 as a destination address. A routing entry is formed on the SPE, namely a corresponding relationship indicating that a next-hop node is 1.1.1.1 when a destination node is 1.1.1.1, and a route extension message is sent according to a forwarding outgoing interface. When receiving a label mapping message, the TPE5 and the TPE6 respectively form an entry, namely a corresponding relationship indicating that a next-hop node is 2.2.2.2 when a destination address is 1.1.1.1.

The TPE5 and the TPE6 send a route extension message, and release routing information with 5.5.5.5 as a destination node. When the SPE forms, according to a label mapping message, an entry, namely a corresponding relationship indicating that next hops are 3.3.3.3 and 4.4.4.4 respectively when a destination address is 5.5.5.5; and the TPE1 forms an entry, namely a corresponding relationship indicating that a next hop is 2.2.2.2 when a destination address is 5.5.5.5.

2. Pseudo Wire Establishment:

One pseudo wire from the TPE1 to the SPE is established. When the pseudo wire is established from the SPE, and when the TPE1 receives pseudo wire establishing signaling, where the pseudo wire establishing signaling requests that a pseudo wire to a device that is corresponding to a destination address 5.5.5.5 be established, two pseudo wires are established from the SPE according to two next hop addresses in routing entry information. During establishment, an active/standby condition of the pseudo wires may be set according to preset configuration.

After at least two pseudo wires are established, when the SPE determines that an active pseudo wire is faulty, an active/standby pseudo wire switchover may be performed by directly configuring information receiving and sending at an interface to the TPE5 and configuring information receiving and sending at an interface to the TPE6, and a TPE that is connected to a customer edge does not need to send switchover signaling to perform a switchover. In this way, a recovery process of a pseudo wire is simplified.

The method for establishing a pseudo wire in this embodiment is applicable to pseudo wire establishment in an MS-PW system, and includes: forming, by a switching provider edge, pseudo wire routing entry information, where the pseudo wire routing entry information includes a corresponding relationship between a first destination address and at least two next hop addresses, or information of at least two different routes to a device that is corresponding to the first destination address; and when pseudo wire establishing signaling is received, where the pseudo wire establishing signaling requests that a pseudo wire to the device that is corresponding to the first destination address be established, establishing at least two pseudo wires from a local device according to the at least two next hop addresses, or the information of at least two different routes to the device that is corresponding to the first destination address. Compared with the prior art in which a TPE device needs to send switchover signaling of an active/standby pseudo wire to perform a switchover, with the method in this embodiment of the present invention, after at least two multi-hop pseudo wires are established, one of the pseudo wires is an active pseudo wire. In this way, when the switching provider edge determines that the active pseudo wire is faulty, an active/standby pseudo wire switchover is directly performed, so that a recovery process of a pseudo wire is simplified, and a network resource can also be saved.

Device Embodiment 1

Figure 7:
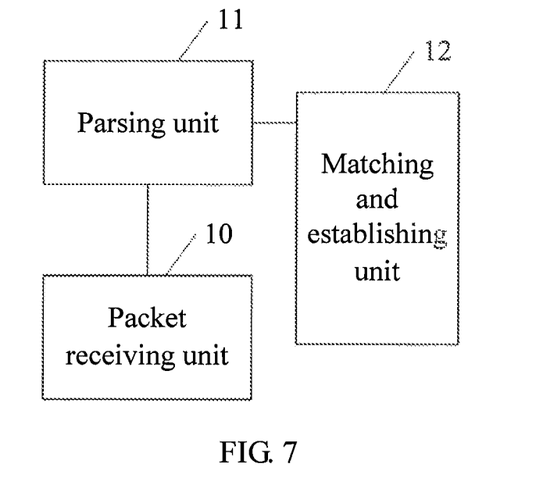
FIG. 7 is a schematic structural diagram of a switching provider edge according to a first device embodiment of the present invention.

A switching provider edge, a schematic structural diagram of which is shown in FIG. 7, includes:

A packet receiving unit 10 is configured to receive a label mapping message, where the label mapping message includes: information of a switching provider edge at a bifurcation position and information of at least two next hops or at least two outgoing interfaces of the switching provider edge at the bifurcation position.

The switching provider edge at the bifurcation position here refers to a switching provider edge that implements redundancy protection of a pseudo wire. It may be that the switching provider edge is connected to two different TPE devices, and it may also be that the switching provider edge may reach the same next-hop device through different outgoing interfaces. The label mapping message may further include explicit path information that is used for releasing explicit routing information, and active/standby information indicating establishment of at least two pseudo wires, and so on.

A parsing unit 11 is configured to parse the label mapping message received by the packet receiving unit 10 to obtain the information of the switching provider edge at the bifurcation position and the information of at least two next hops or at least two outgoing interfaces.

It may be understood that, the parsing unit 11 may specifically be a sub-TLV parsing unit, configured to parse explicit path information such as information of additional type Sub-TLV in TLV, in the label mapping message, to obtain the information of the switching provider edge at the bifurcation position and the information of at least two next hops or at least two outgoing interfaces of the switching provider edge.

A matching and establishing unit 12 is configured to compare the information of the switching provider edge at the bifurcation position with information of a local device, where the information of the switching provider edge at the bifurcation position is obtained through parsing by the parsing unit 11, and if the information of the switching provider edge at the bifurcation position matches with the information of the local device, establish at least two pseudo wires from the switching provider edge according to the information of at least two next hops or at least two outgoing interfaces.

For example, if the information of the switching provider edge at the bifurcation position matches with the information of the local device, where the information of the switching provider edge at the bifurcation position is obtained by the matching and establishing unit 12, it indicates that the switching provider edge is the switching provider edge at the bifurcation position. Then, at least two pseudo wires are established from the switching provider edge according to the information of at least two next hops or at least two outgoing interfaces. Specifically, one pseudo wire is established between the switching provider edge and a TPE device that is corresponding to information of each next hop address, or a pseudo wire is established between the switching provider edge and a next-hop TPE device respectively through at least two outgoing interfaces. If the information of the switching provider edge at the bifurcation position does not match with the information of the local device, it indicates that the switching provider edge is not located at a bifurcation position. Then, the label mapping message is forwarded to a next-hop node device to complete establishment of an MS-PW segment.

During a pseudo wire establishment process, one of the pseudo wires may be set as an active pseudo wire, and another pseudo wire may be set as a standby pseudo wire according to a preset policy. In this way, after the pseudo wires are established, when the switching provider edge at the bifurcation position determines that the active pseudo wire is faulty, a fast protection switchover of a pseudo wire may be completed directly.

Figure 8:
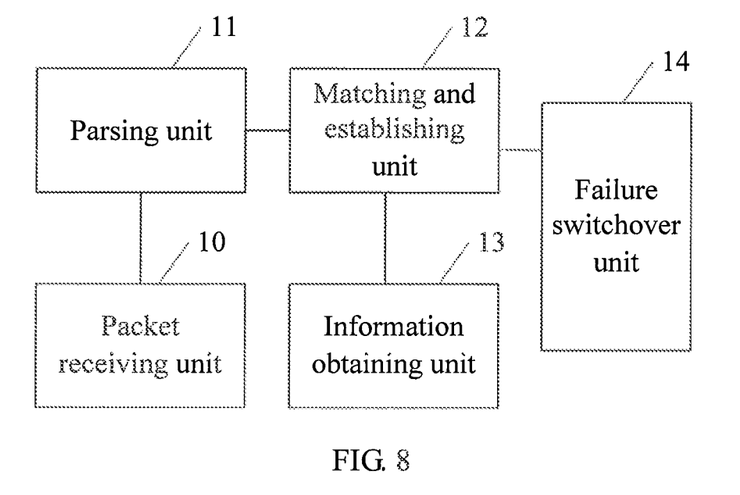
FIG. 8 is a schematic structural diagram of another switching provider edge according to the first device embodiment of the present invention.

Referring to FIG. 8, in a specific embodiment, a switching provider edge may further include an information obtaining unit 13, configured to obtain active/standby relationship information for establishing at least two pseudo wires, and a matching and establishing unit 12 establishes a pseudo wire according to the active/standby relationship information obtained by the information obtaining unit 13.

Specifically, the information obtaining unit 13 may be a parsing sub-unit, configured to parse the label mapping message received by the packet receiving unit 10 to obtain active/standby relationship information of at least two pseudo wires, and may also be a notification receiving and parsing sub-unit, configured to receive an active/standby pseudo wire information notification sent by a TPE that is connected to a customer edge, and parse the active/standby pseudo wire information notification to obtain the active/standby relationship information of the at least two pseudo wires.

In another specific embodiment, a switching provider edge may further include: a failure switchover unit 14, configured to perform an active/standby pseudo wire switchover when it is determined that an active pseudo wire of the at least two pseudo wires that are established by the matching and establishing unit 12 is faulty.

In the switching provider edge in this embodiment, the packet receiving unit 10 receives the label mapping message sent by the TPE that is directly connected to the customer edge. The parsing unit 11 obtains the information of the switching provider edge at the bifurcation position and the information of at least two next hops or at least two outgoing interfaces of the switching provider edge through parsing. If the information of the switching provider edge at the bifurcation position matches with the information of the local device, the matching and establishing unit 12 establishes at least two pseudo wires from the switching provider edge according to the information of at least two next hops or at least two outgoing interfaces. When the switching provider edge in this embodiment of the present invention establishes at least two pseudo wires, the TPE only needs to send one label mapping message to establish at least two pseudo wires. Compared with the prior art in which a TPE sends one label mapping message to establish one pseudo wire, the switching provider edge in this embodiment establishes multiple pseudo wires from a local device to a destination node, and in this way, a resource consumed by pseudo wire establishment can be reduced. In addition, after the switching provider edge at the bifurcation position establishes two pseudo wires, establishment of multiple MS-PW segments is completed, and an identification of an active/standby MS-PW segment may be implemented. When the failure switchover unit 14 determines that an active pseudo wire is faulty, a fast protection switchover of an MS-PW may be implemented on the switching provider edge. In this way, a fast recovery process of a pseudo wire is speeded up, and segment protection of the MS-PW may be provided from the switching provider edge at the bifurcation position, thereby making better use of a network resource.

Device Embodiment 2

Figure 9:
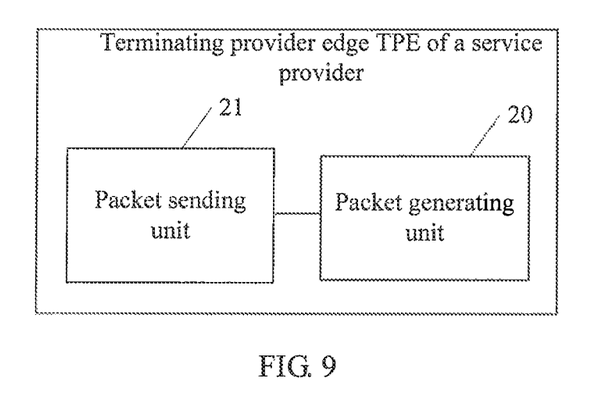
FIG. 9 is a schematic structural diagram of a TPE according to a second device embodiment of the present invention.

A terminating provider edge TPE of a service provider, a schematic structural diagram of which is shown in FIG. 9, includes:

A packet generating unit 20 is configured to generate a label mapping message, where the label mapping message includes: information of a switching provider edge at a bifurcation position and information of at least two next hops or at least two outgoing interfaces of the switching provider edge at the bifurcation position.

When generating the label mapping message, the packet generating unit 20 may add additional information Sub-TLV to explicit path information TLV in the label mapping message, and add the information of the switching provider edge at the bifurcation position and the information of at least two next hops or at least two outgoing interfaces of the switching provider edge to an additional type Sub-TLV.

A packet sending unit 21 sends the label mapping message generated by the packet generating unit 20 to a switching provider edge, so that a switching provider edge that matches with the information of the switching provider edge at the bifurcation position establishes at least two pseudo wires from the switching provider edge according to the information of two next hops or at least two outgoing interfaces.

Figure 10:
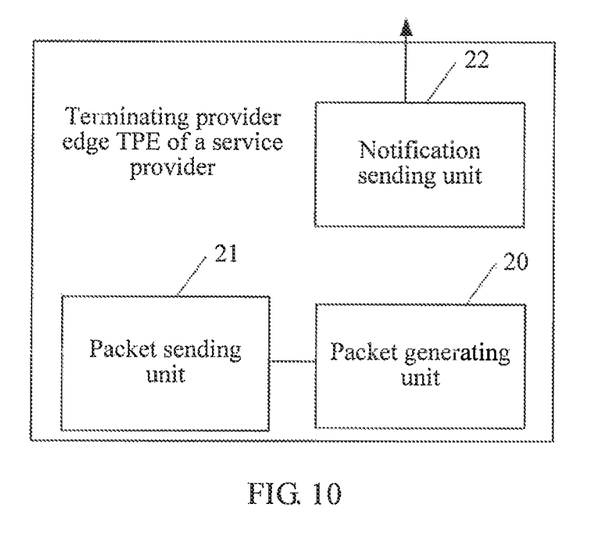
FIG. 10 is a schematic structural diagram of another TPE according to the second device embodiment of the present invention.

Referring to FIG. 10, in a specific embodiment, a TPE may further include: a notification sending unit 22, configured to send an active/standby pseudo wire information notification to a switching provider edge, so that a switching provider edge that matches with information of a switching provider edge at a bifurcation position also establishes at least two pseudo wires according to the active/standby pseudo wire information notification.

In the terminating provider edge TPE of the service provider in this embodiment, the packet generating unit 20 generates the label mapping message, where the label mapping message includes the information of the switching provider edge at the bifurcation position and the information of at least two next hops or at least two outgoing interfaces of the switching provider edge, and the packet sending unit 21 sends the label mapping message. After receiving the label mapping message, the switching provider edge at the bifurcation position establishes at least two pseudo wires from the switching provider edge according to the information of at least two next hops or at least two outgoing interfaces. Compared with the prior art in which a TPE sends one label mapping message to establish one pseudo wire, in this embodiment, the TPE only needs to send one label mapping message to establish at least two pseudo wires, thereby reducing a resource consumed by pseudo wire establishment. In addition, after the switching provider edge at the bifurcation position establishes at least two pseudo wires, one of the pseudo wires is an active pseudo wire. In this way, when the active pseudo wire is faulty, an active/standby pseudo wire switchover may be performed directly. Compared with the prior art in which the TPE needs to send switchover signaling to perform a switchover, a process of a pseudo wire protection switchover is simplified, and segment protection may be provided from the switching provider edge at the bifurcation position, thereby making better use of a network resource.

Device Embodiment 3

Figure 11:
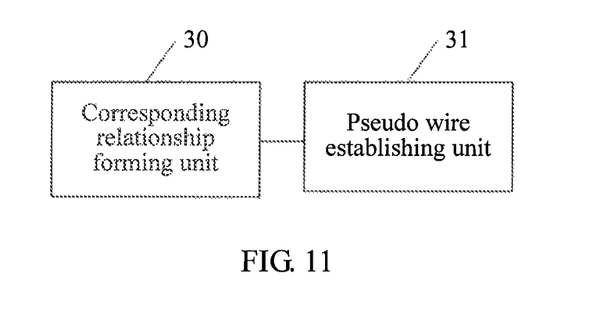
FIG. 11 is a schematic structural diagram of a switching provider edge according to a third device embodiment of the present invention.

A switching provider edge, a schematic structural diagram of which is shown in FIG. 11, includes:

A corresponding relationship forming unit 30 is configured to form pseudo wire routing entry information, where the pseudo wire routing entry information includes: a corresponding relationship between a first destination address and at least two next hop addresses, or information of at least two different routes to a device that is corresponding to the first destination address.

It may be understood that, the corresponding relationship forming unit 30 forms the pseudo wire routing entry information after receiving a route extension message and during a route information diffusion process of a TPE device.

A pseudo wire establishing unit 31 is configured to, when receiving pseudo wire establishing signaling, where the pseudo wire establishing signaling requests that a pseudo wire to the device that is corresponding to the first destination address be established, establish at least two pseudo wires from a local device according to the at least two next hop addresses that are corresponding to the first destination address, or the information of at least two different routes to the device that is corresponding to the first destination address, where the at least two next hop addresses that are corresponding to the first destination address, or the information of at least two different routes to the device that is corresponding to the first destination address is formed by the corresponding relationship forming unit 30.

Figure 12:
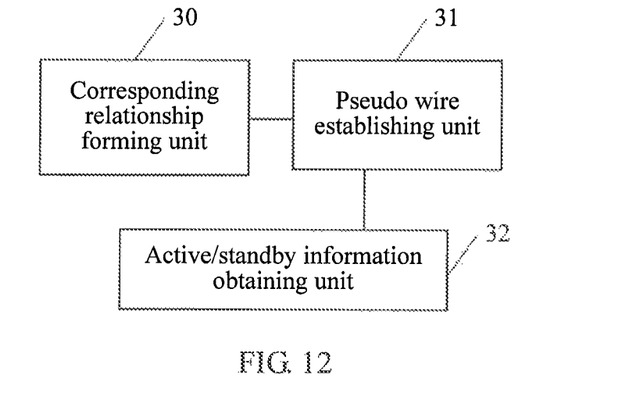
FIG. 12 is a schematic structural diagram of another switching provider edge according to the third device embodiment of the present invention.

Referring to FIG. 12, in a specific embodiment, a device in this embodiment may further include:

an active/standby information obtaining unit 32, configured to obtain active/standby pseudo wire information of at least two pseudo wires; and a pseudo wire establishing unit 31 establishes at least two pseudo wires from a local device according to the active/standby pseudo wire information obtained by the active/standby information obtaining unit 32.

In the switching provider edge in this embodiment, the corresponding relationship forming unit 30 forms the pseudo wire routing entry information, where the pseudo wire routing entry information includes the corresponding relationship between the first destination address and the at least two next hop addresses, or the information of at least two different routes to the device that is corresponding to the first destination address. When receiving the pseudo wire establishing signaling, where the pseudo wire establishing signaling requests that a pseudo wire to the device that is corresponding to the first destination address be established, the pseudo wire establishing unit 31 establishes at least two pseudo wires from the local device according to the at least two next hop addresses, or the information of at least two different routes to the device that is corresponding to the first destination address. Compared with the prior art in which a TPE device sends active/standby pseudo wire switchover signaling to perform a switchover, with the method in this embodiment of the present invention, after at least two multi-hop pseudo wires are established, one of the pseudo wires is an active pseudo wire. In this way, when the switching provider edge determines that the active pseudo wire is faulty, an active/standby pseudo wire switchover is directly performed, so that a recovery process of a pseudo wire is simplified, and a network resource can also be saved.

System Embodiment

Figure 13:
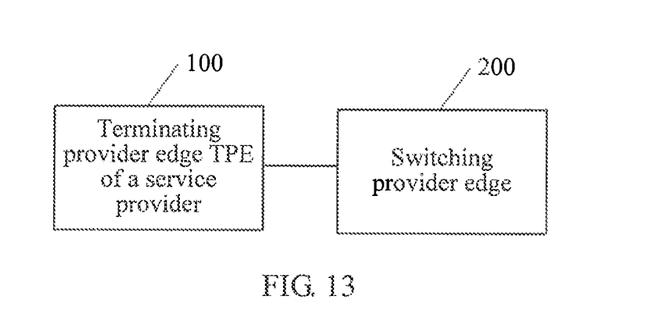
FIG. 13 is a schematic structural diagram of a system for establishing a pseudo wire according to a system embodiment of the present invention.

A system for establishing a pseudo wire, a schematic structural diagram of which is shown in FIG. 13, includes a switching provider edge 200 and a terminating provider edge TPE of a service provider 100, where:

the terminating provider edge TPE of the service provider 100 is configured to generate a label mapping message, where the label mapping message includes information of a switching provider edge at a bifurcation position and information of at least two next hops or at least two outgoing interfaces of the switching provider edge at the bifurcation position; and send the generated label mapping message to the switching provider edge 200; and the switching provider edge 200 is configured to receive the label mapping message, parse the label mapping message to obtain the information of the switching provider edge at the bifurcation position and the information of at least two next hops or at least two outgoing interfaces of the switching provider edge at the bifurcation position, compare the information of the switching provider edge at the bifurcation position with information of a local device, and if the information of the switching provider edge at the bifurcation position matches with information of a local device, establish at least two pseudo wires from the switching provider edge according to the information of at least two next hops or at least two outgoing interfaces.

It can be seen that, the method for establishing a pseudo wire in this embodiment of the present invention is applicable to pseudo wire establishment in an MS-PW system, and includes: receiving, by a switching provider edge, a label mapping message sent by a TPE that is directly connected to a customer edge, obtaining information of a switching provider edge at a bifurcation position and information of at least two next hops or at least two outgoing interfaces of the switching provider edge through parsing, and establishing at least two pseudo wires from the switching provider edge according to the information of at least two next hops or at least two outgoing interfaces. When the method in this embodiment of the present invention is adopted to establish at least two pseudo wires, a TPE, only needs to send one label mapping message to establish at least two pseudo wires. Compared with the prior art in which a TPE sends one label mapping message to establish one pseudo wire, with the method for establishing a pseudo wire in this embodiment, multiple pseudo wires from the switching provider edge at the bifurcation position to a destination node are required, and in this way, a network resource can be saved and highly effective protection for an MSPW can be provided. In addition, the switching provider edge at the bifurcation position establishes two pseudo wires, and completes establishment of multiple MS-PW segments, and furthermore, an identification of an active/standby MS-PW segment may be implemented. When it is determined that an active pseudo wire segment is faulty, a fast protection switchover of an MS-PW may be implemented on the switching provider edge. In this way, a fast recovery process of a pseudo wire is speeded up, and segment protection of the MS-PW can be provided from the switching provider edge at the bifurcation position, thereby making better use of a network resource.

Persons of ordinary skill in the art may understand that all or a part of steps of various methods in the foregoing embodiments may be implemented by a program instructing relevant hardware. The program may be stored in a computer readable storage medium, and the storage medium may include a Read Only Memory (ROM), a Random Access Memory (RAM), a magnetic disk, or an optical disk, and so on.

A method, a system, and a device for establishing a pseudo wire that are provided in the embodiments of the present invention are introduced in detail in the foregoing. In this specification, Specific examples are used for illustrating principles and implementation manners of the present invention. The foregoing descriptions of the embodiments are merely used to help understand the methods of the present invention. Meanwhile, persons of ordinary skill in the art may make modifications to the specific implementation manners and application scopes according to the idea of the present invention. In conclusion, the content of the specification shall not be construed as a limitation to the present invention.

What is claimed is:

1. A method for establishing a pseudo wire, comprising:
receiving, by a switching provider edge, a label mapping message sent by a terminating provider edge (TPE) connected to a customer edge, wherein the label mapping message comprises information of a switching provider edge at a bifurcation position, and information of at least two outgoing interfaces of the switching provider edge at the bifurcation position, the switching provider edge at the bifurcation position implements redundancy protection of a pseudo wire, wherein the switching provider edge at the bifurcation position reaches the TPE through the at least two outgoing interfaces;
parsing, by the switching provider edge that receives the label mapping message, the label mapping message to obtain the information of the switching provider edge at the bifurcation position, and the information of the at least two outgoing interfaces; and
comparing information of the switching provider edge that receives the label mapping message with the information of the switching provider edge at the bifurcation position, and if the information of the switching provider edge that receives the label mapping message matches with the information of the switching provider edge at the bifurcation position, establishing at least two pseudo wires from the switching provider edge that receives the label mapping message according to the information of the at least two outgoing interfaces, wherein one of the at least two pseudo wires is set as an active pseudo wire and another pseudo wire of the at least two pseudo wires is set as a standby pseudo wire.

2. The method according to claim 1,
wherein before the establishing at least two pseudo wires from the switching provider edge that receives the label mapping message according to the information of the at least two outgoing interfaces, the method further comprises:
obtaining active/standby relationship information of at least two pseudo wires, and
establishing the at least two pseudo wires according to the active/standby relationship information.

3. The method according to claim 2, wherein the obtaining the active/standby relationship information of the at least two pseudo wires comprises:
parsing the label mapping message to obtain the active/standby relationship information of the at least two pseudo wires; or
receiving an active/standby pseudo wire information notification sent by the TPE, and parsing the active/standby pseudo wire information notification.

4. A method for establishing a pseudo wire, comprising:
forming, by a switching provider edge at a bifurcation position, pseudo wire routing entry information, wherein the switching provider edge at the bifurcation position implements redundancy protection of a pseudo wire, the pseudo wire routing entry information comprises: a corresponding relationship between a first destination address and addresses of at least two next hops sharing an anycast address, or information of at least two different pseudo wire routes to a device that is corresponding to the first destination address; and when receiving pseudo wire establishing signaling, wherein the pseudo wire establishing signaling requests that a pseudo wire to the device that is corresponding to the first destination address be established, establishing, by the switching provider edge, at least two pseudo wires from the switching provider edge to the device that is corresponding to the first destination address via the at least two next hops according to the addresses of the at least two next hops, or the information of the at least two different pseudo wire routes to the device that is corresponding to the first destination address.

5. The method according to claim 4,
wherein before the establishing at least two pseudo wires from the switching provider edge to the device that is corresponding to the first destination address according to the addresses of the at least two next hops or the information of the at least two different pseudo wire routes to the device that is corresponding to the first destination address, the method further comprises:
obtaining active/standby pseudo wire information of the at least two pseudo wires, and
wherein the at least two pseudo wires from the switching provider edge to the device that is Corresponding to the first destination address are established according to the active/standby pseudo wire information.

6. A switching provider edge, comprising:
a packet receiving unit, configured to receive a label mapping message sent by a terminating provider edge (TPE) connected to a customer edge, wherein the label mapping message comprises: information of a switching provider edge at a bifurcation position, and information of at least two outgoing interfaces of the switching provider edge at the bifurcation position, wherein the switching provider edge at the bifurcation position implements redundancy protection of a pseudo wire, wherein the switching provider edge at the bifurcation position reaches the TPE through the at least two outgoing interfaces;
a parsing unit, configured to parse the label mapping message received by the packet receiving unit to obtain the information of the switching provider edge at the bifurcation position, and the information of the at least two outgoing interfaces; and
a matching and establishing unit, configured to compare the information of the switching provider edge at the bifurcation position with information of a local device, wherein the information of the switching provider edge at the bifurcation position is obtained by the parsing unit through parsing, and if the information of the switching provider edge at the bifurcation position matches with the information of the local device, establish at least two pseudo wires from the switching provider edge according to the information of the at least two outgoing interfaces, wherein one of the at least two pseudo wires is set as an active pseudo wire and another pseudo wire of the at least two pseudo wires is set as a standby pseudo wire.

7. The switching provider edge according to claim 6, further comprising:
an information obtaining unit, configured to obtain active/standby relationship information of the at least two pseudo wires,
wherein the matching and establishing unit establishes the at least two pseudo wires according to the active/standby relationship information that is obtained by the information obtaining unit.

8. A terminating provider edge (TPE) of a service provider, comprising:

a packet generating unit, configured to generate a label mapping message, wherein the label mapping message comprises: information of a switching provider edge at a bifurcation position, and information of at least two outgoing interfaces of the switching provider edge at the bifurcation position, wherein the switching provider edge at the bifurcation position reaches the TPE through the at least two outgoing interfaces; and
a packet sending unit, configured to send the label mapping message generated by the packet generating unit to a switching provider edge, so that a switching provider edge receiving the label mapping message that matches with the information of the switching provider edge at the bifurcation position establishes at least two pseudo wires from the switching provider edge according to the information of the at least two outgoing interfaces, wherein one of the at least two pseudo wires is set as an active pseudo wire and another pseudo wire of the at least two pseudo wires is set as a standby pseudo wire.

9. The terminating provider edge according to claim 8, further comprising:
a notification sending unit, configured to send an active/standby pseudo wire information notification to the switching provider edge receiving the label mapping message, so that the switching provider edge receiving the label mapping message that matches with the information of the switching provider edge at the bifurcation position establishes the at least two pseudo wires according to the active/standby pseudo wire information notification.

10. A switching provider edge at a bifurcation position, wherein the switching provider edge implements redundancy protection of a pseudo wire, the switching provider edge comprises:
a corresponding relationship forming unit, configured to form pseudo wire routing entry information, wherein the pseudo wire routing entry information comprises: a corresponding relationship between a first destination address and addresses of at least two next hops sharing an anycast address, or information of at least two different pseudo wire routes to a device that is corresponding to the first destination address; and
a pseudo wire establishing unit, configured to, when receiving pseudo wire establishing signaling, wherein the pseudo wire establishing signaling requests that a pseudo wire to the device that is corresponding to the first destination address be established, establish at least two pseudo wires from the switching provider edge to the device that is corresponding to the first destination address via the at least two next hops according to the addresses of the at least two next hops, or the information of the at least two different pseudo wire routes to the device that is corresponding to the first destination address.

11. The switching provider edge according to claim 10, further comprising:
an active/standby information obtaining unit, configured to obtain active/standby pseudo wire information of the at least two pseudo wires, wherein
the pseudo wire establishing unit establishes the at least two pseudo wires from the switching provider edge to the device that is corresponding to the first destination address according to the active/standby pseudo wire information that is obtained by the active/standby information obtaining unit.

12. A system for establishing a pseudo wire, comprising a switching provider edge and a terminating provider edge (TPE) of a service provider, wherein the terminating provider edge (TPE) of the service provider is configured to generate a label mapping message, wherein the label mapping message comprises information of a switching provider edge at a bifurcation position, and information of at least two outgoing interfaces of the switching provider edge at the bifurcation position, and configured to send the generated label mapping message to the switching provider edge, wherein the switching provider edge at the bifurcation position reaches the TPE through the at least two outgoing interfaces; and the switching provider edge is configured to receive the label mapping message, parse the label mapping message to obtain the information of the switching provider edge at the bifurcation position, and the information of the at least two outgoing interfaces, compare the information of the switching provider edge at the bifurcation position with information of a local device, and if the information of the switching provider edge at the bifurcation position matches with the information of the local device, establish at least two pseudo wires from the switching provider edge according to the information of the at least two outgoing interfaces, wherein one of the at least two pseudo wires is set as an active pseudo wire and another pseudo wire of the at least two pseudo wires is set as a standby pseudo wire.

13. The system according to claim 12, wherein the TPE comprises:

a packet generating unit, configured to generate the label mapping message; and a packet sending unit, configured to send the label mapping message generated by the packet generating unit to the switching provider edge.

* * * * *

UNITED STATES PATENT AND TRADEMARK OFFICE
CERTIFICATE OF CORRECTION

PATENT NO. : 9,160,655 B2  Page 1 of 1
APPLICATION NO. : 13/548880
DATED : October 13, 2015
INVENTOR(S) : Chaowa Qiu et al.

It is certified that error appears in the above-identified patent and that said Letters Patent is hereby corrected as shown below:

On the Title Page

Left column, item (75), replace "Li Xuei," with --Li Xue,--.

Signed and Sealed this
Twenty-third Day of February, 2016

Michelle K. Lee
*Director of the United States Patent and Trademark Office*